United States Patent [19]

Gellert

[11] Patent Number: 4,891,001
[45] Date of Patent: Jan. 2, 1990

[54] SPRUE GATED STACK INJECTION MOLDING SYSTEM

[76] Inventor: Jobst U. Gellert, 7A Prince Street, Georgetown, Ontario, Canada, L7G 2X1

[21] Appl. No.: 306,159

[22] Filed: Feb. 6, 1989

[30] Foreign Application Priority Data

Jan. 31, 1989 [CA] Canada .................................... 589614

[51] Int. Cl.$^4$ .............................................. B29C 45/22
[52] U.S. Cl. .................... 425/549; 264/297.2; 264/297.4; 264/328.8; 264/328.15; 425/552; 425/562; 425/567; 425/570; 425/572; 425/588
[58] Field of Search ............... 425/547, 548, 549, 552, 425/562, 567, 570, 572, 588; 264/297.1, 297.2, 297.4, 328.8, 328.15

[56] References Cited

U.S. PATENT DOCUMENTS

| | | | |
|---|---|---|---|
| 4,212,626 | 7/1980 | Gellert | 425/562 |
| 4,586,887 | 5/1986 | Gellert | 425/549 |
| 4,768,283 | 9/1988 | Gellert | 425/549 |

Primary Examiner—Jay H. Woo
Assistant Examiner—Timothy W. Heitbrink
Attorney, Agent, or Firm—Riches, Mckenzie & Herbert

[57] ABSTRACT

A stack injection molding system for conveying melt from an upstream heated nozzle seated in a fixed mold platen to an aligned downstream heated nozzle in a movable mold platen. The upstream dowstream nozzles each have a nose portion with a forward face which abuts against each other in the parting line in the closed position. The melt passage extends through aligned central melt bores in the nozzles which taper inwardly adjacent the forward faces to form a sprue gate where they join. While both nozzles have an integral electrical heating element, only the heating element of the upstream nozzle has a circular forward portion which is brazed in the nose portion to encircle the melt bore and provide more heat and better control adjacent the sprue gate. Before the mold is opened along the parting line for ejection during the injection cycle, power to the heating elements of the nozzles is turned off to avoid drooling of melt from the open sprue gate.

5 Claims, 2 Drawing Sheets

SPRUE GATED STACK INJECTION MOLDING SYSTEM

BACKGROUND OF THE INVENTION

This invention relates to injection molding and more particularly to an improved stack molding system for conveying melt from a fixed platen to a movable platen.

Hot runner injection molding systems utilizing stack molding to convey melt to a manifold in a movable platen to increase the number of cavities are well known in the art. An early example using valve gated nozzle is shown in the applicant's U.S. Pat. No. 4,212,626 which issued July 15, 1980. In order to avoid the difficulties and problems associated with valve gating, the applicant's more recent U.S. Pat. No. 4,586,887 which issued May 6, 1986 provides a stack molding system which uses heated probes to provide a hot tip. While this works satisfactory for some materials, polymer insulated hot runners are difficult with easily stringing materials such as polypropylene, polyethylene, nylon, etc.

SUMMARY OF THE INVENTION

Accordingly, it is an object of the present invention to at least partially overcome the disadvantages of the prior art by providing a stack molding system with an open pipeline or sprue gate which does not require valve gating and wherein the melt flow passage is heated from the outside.

To this end, in one of its aspects, the invention provides a stack injection molding system for conveying melt from a fixed platen through a sprue gate to a movable platen, the movable platen being actuated according to an operating cycle between a closed position; wherein the fixed and movable platens abut and an open position wherein the fixed and movable platens separate along a parting line, the system comprising an upstream heated nozzle having an outer surface, a rear end, a front end and a nose portion with a forward face at the front end, the upstream nozzle having a melt bore which extends centrally therethrough from an inlet at the rear end to an outlet at the forward face of the nose portion, the upstream nozzle having an electrically insulated heating element with a first portion extending from a terminal, a second portion integrally brazed in a spiral channel in the outer surface and a circular third portion integrally brazed in the nose portion of the nozzle to substantially encircle the central melt bore extending therethrough, the upstream nozzle being seated in the fixed platen with the nose portion extending through an opening in the fixed platen to the parting line, and a downstream heated nozzle having an outer surface, a rear end, a front end and a nose portion with a forward face at the front end, the downstream nozzle having a melt bore which extends centrally therethrough from an inlet at the forward face of the front end to an outlet at the rear end, the downstream nozzle having an electrically insulated heating element with a first portion extending from a terminal and a second portion integrally brazed in a spiral channel in the outer surface, the downstream nozzle being seated in the movable platen with the melt bore through the downstream nozzle in alignment with the melt bore through the upstream nozzle and the nose portion of the downstream nozzle extending through an opening in the movable platen to a position wherein the forward face of the nose portion of the downstream nozzle abuts against the forward face of the nose portion of the upstream nozzle in the closed position.

Further objects and advantages of the invention will appear from the following description taken together with the accompanying drawings.

DETAILED DESCRIPTION OF THE DRAWINGS

Figure 1:
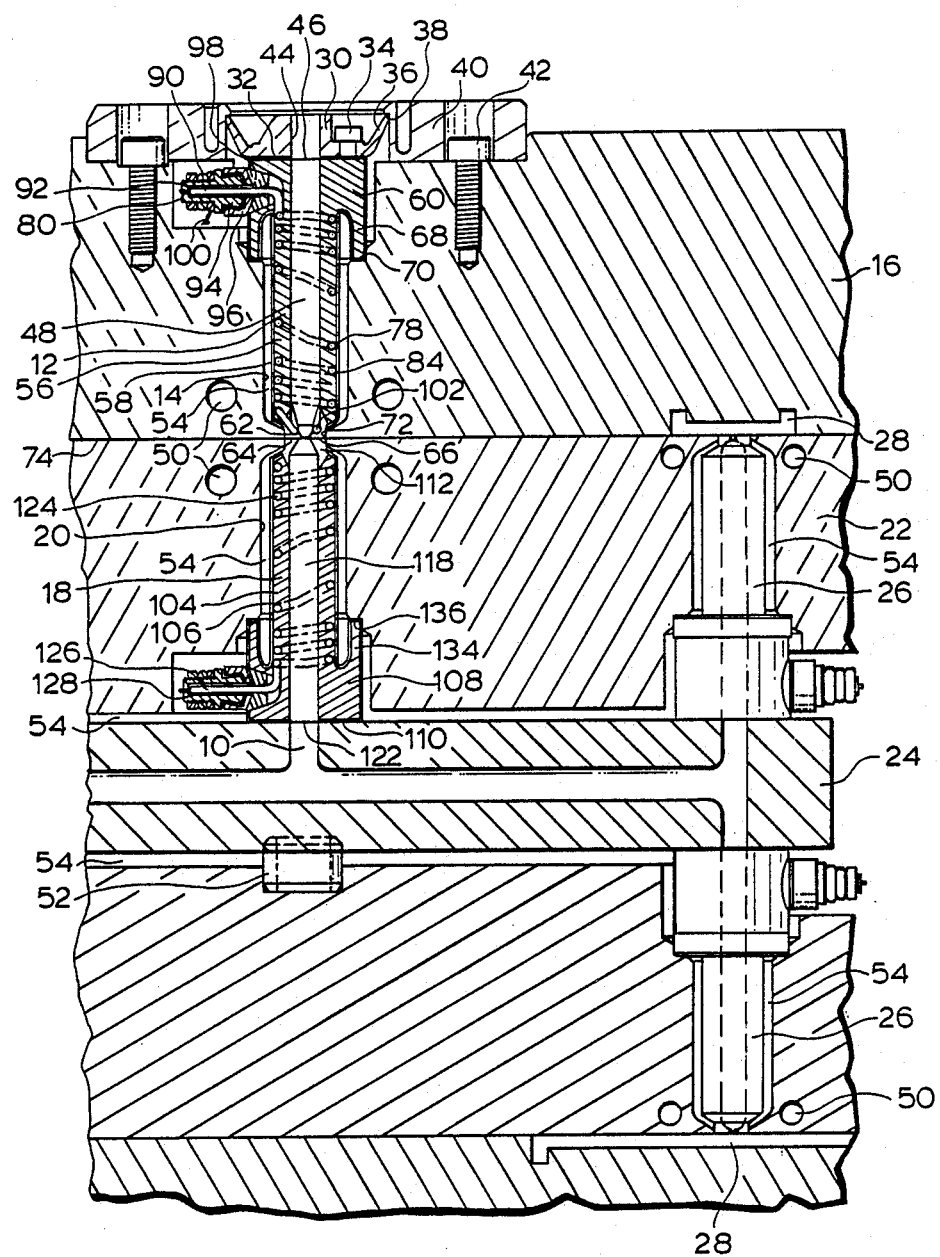
FIG. 1 is a partial sectional view of a stack molding system according to a preferred embodiment of the invention.

Reference is first made to FIG. 1 which shows a stack molding system for conveying melt through a melt passage 10 extending from an upstream heated nozzle 12 seated in a well 14 in a fixed mold platen 16 to a downstream heated nozzle 18 seated in a well 20 in a movable mold platen 22. The melt passage 10 then branches in a manifold 24 and extends through a number of other heated nozzles 26 to cavities 28.

In this embodiment the upstream nozzle 12 has a backplate 30 fastened to its rear end 32 by bolts 34 and is secured in place in the well 14 in the fixed mold platen 16 by a thin flanged portion 36 of the backplate 30 abutting against an inwardly extending shoulder 38 of a retaining collar 40 which is fastened by bolts 42 to the fixed mold platen. As described in the applicant's Canadian patent application serial number 557,681 filed Jan. 29, 1988 entitled "Mounting for Injection Molding Nozzles", the backplate 30 has a central bore 44 which is in alignment with an inlet 46 to the central melt bore 48 through the upstream nozzle 12 to receive melt from a molding machine (not shown). The mold platens 16,22 are cooled by pumping cooling water through cooling conduits 50. The manifold 24 is laterally secured by a locating ring 52 and the hot nozzles 12,18,26 and manifold 24 are separated from the cooled mold platens 16,22 by insulative air spaces 54 between them.

The upstream nozzle 12 is made as described in the applicants Canadian patent application serial number 578,973 filed Sept. 30, 1988 entitled "Injection Molding Nozzle Having Nose Portion with Heating Element Encircling the Bore and Method". It has a central portion 56 with a cylindrical outer surface 58 extending between a collar portion 60 adjacent the rear end 32 and a nose portion 62 having a forward face 64 at the front end 66. The upstream nozzle 12 is accurately located in position by a circumferential insulating flange 68 which extends from the collar portion 60 sitting against a circumferential shoulder 70 and the nose portion 62 being received in a matching opening 72 in the fixed mold platen 16. As can be seen, the nose portion 62 extends through the opening to a position wherein the forward face 64 of the nose portion 62 is flush with the parting line 74 at the operating temperature. The central melt bore 48 extends through the upstream nozzle 12 from the inlet 46 at the rear end 32 to an outlet 76 at the front end 66. As described in more detail below, the melt bore 48 tapers inwardly adjacent the forward face 64 of the nose portion 62.

The upstream nozzle 12 is heated by an electrically insulated heating element 78 which has a chrome nickel resistance wire 80 extending centrally through a refractory powder electrical insulating material such as magnesium oxide inside a steel casing 82. The heating element 78 has a central portion 84 which is integrally brazed in a spiral channel 86 in the outer surface 58 of the central portion 56 of the upstream nozzle 12. The central portion 84 of the heating element 78 in the channel 86 is covered by a protective nickel coating 88 which is applied as described in the applicant's U.S. Pat. No. 4,768,283 which issued Sept. 6, 1988. The heating element 78 has a rear portion 90 which extends outwardly from the central portion 84 to an electrical terminal 92 which is made by a method described in detail in the applicant's patent application Ser. No. 578,975 filed Sept. 30, 1988 entitled "Method of Manufacture of an Electrical Terminal on an Injection Molding Nozzle". The rear portion 90 extends through a terminal body 94 with a protective cap 96 which is fixed to a steel plug 98. The heating element 78 is stripped adjacent the rear end to expose the resistance wire 80 which is electrically connected to the terminal body 94. However the terminal body is electrically insulated from the heating element casing 82 and the protective cap 96 by a thin coating of insulating material such as magnesium oxide. Thus, the terminal body 94 is structurally secured to withstand torque applied by an external lead 100 being connected to it.

The heating element 78 also has a circular forward portion 102 which is integrally brazed in the nose portion 62 of the upstream nozzle 12 to substantially encircle the central melt bore 48. The casing 82 and insulating material are also stripped to expose the resistance wire 80 adjacent the forward end of the low voltage single wire heating element 78 so it is grounded to complete the circuit when it is brazed in place. Having the circular forward portion 102 of the heating element 78 extending around in the nose portion 62 provides additional heat to the nose portion 62 and allows the temperature of the nose portion 62 to be raised and lowered relatively quickly in sequence with the molding cycle to prevent drooling from the sprue gate when the mold is opened.

The downstream nozzle 18 is very similar to the upstream nozzle 12 in that it has a central portion 104 with a cylindrical outer surface 106 extending between a collar portion 108 adjacent the rear end 110 and a nose portion 112 having a forward face 114 at the front end 116. A central melt bore 118 similarly extends through the downstream nozzle 18 from an inlet 120 at the front end 116 to an outlet 122 at the rear end 110. The downstream nozzle 18 also has an electrically insulated heating element 124 with a rear portion 126 which extends outwardly to a terminal 128 and a spiral portion 130 which is integrally brazed in a spiral channel 132 in the outer surface 106 to encircle the central melt bore 118. However, in this embodiment of the invention, the heating element 124 of the downstream nozzle 18 does not have a circular forward portion in the nose portion 112 as does the upstream nozzle 12.

The downstream nozzle 18 is similarly located in the position in the well 20 in the movable mold platen 22 by a circumferential insulating flange 134 which extends from the collar portion 108 to sit against a circumferential shoulder 136 and by the nose portion 112 being received in a matching opening 138 in the movable mold platen 22. In this position, the forward face 114 of the nose portion 112 is flush with the parting line 74 at the operating temperature and abuts against the forward face 64 of the nose portion 62 of the upstream nozzle 12 in the closed position. The inlet 120 of the melt bore 118 of the downstream nozzle 18 is in alignment with the outlet 76 of the melt bore 48 of the upstream nozzle 12. The rear end 110 of the downstream nozzle 18 abuts against the manifold 24 and the outlet 122 of the melt bore 118 is in alignment with the melt passage 10 extending into the manifold.

In use, the system is assembled as shown and electrical power is applied to the terminals 92,128 to heat the upstream and downstream nozzles 12,18 according to a cycle predetermined in conjunction with the cycle of injecting pressurized melt from a molding machine (not shown) into the melt passage 10 and the movement movable mold platen 22. When the mold plate 22 is in the closed position and the nozzles 12,18 are heated, the pressurized melt which flows through the sprue gate between the melt bore 48 of the upstream nozzle 12 and the melt bore 118 of the downstream nozzle 18 continues through the melt passage 10 in the heated manifold 24 and the other heated nozzles 26 to fill the cavities 28. After the cavities 28 are filled, injection pressure is held momentarily to pack and then released. The electrical power to the upstream and downstream nozzles is switched off and after a short cooling period the mold is opened along the parting line 74 to eject the molded products. The contact between the nose portion 62 of the upstream nozzle 12 and the surrounding cooled mold platen 16 results in a rapid temperature drop which reduces the melt temperature sufficiently to prevent drooling from the sprue gate when the mold is opened. After ejection, the mold is closed and injection pressure is reapplied to refill the cavities 28. Shortly after the mold is opened, electrical power is reapplied to the heating elements 78,124 of the nozzles 12,18 to start heating the frozen melt to reopen the gate as soon as injection pressure is reapplied after the mold is closed following ejection. While heat is also lost from the central portions 56,104 of the nozzles 12,18 while the power is off, the air gap insulated steel masses surrounding the melt bores 48,448 retain sufficient heat so that no solidification occurs in these areas. This cycle is repeated continuously with a frequency dependent on the size and shape of the cavities and the type of material being molded.

Figure 2:
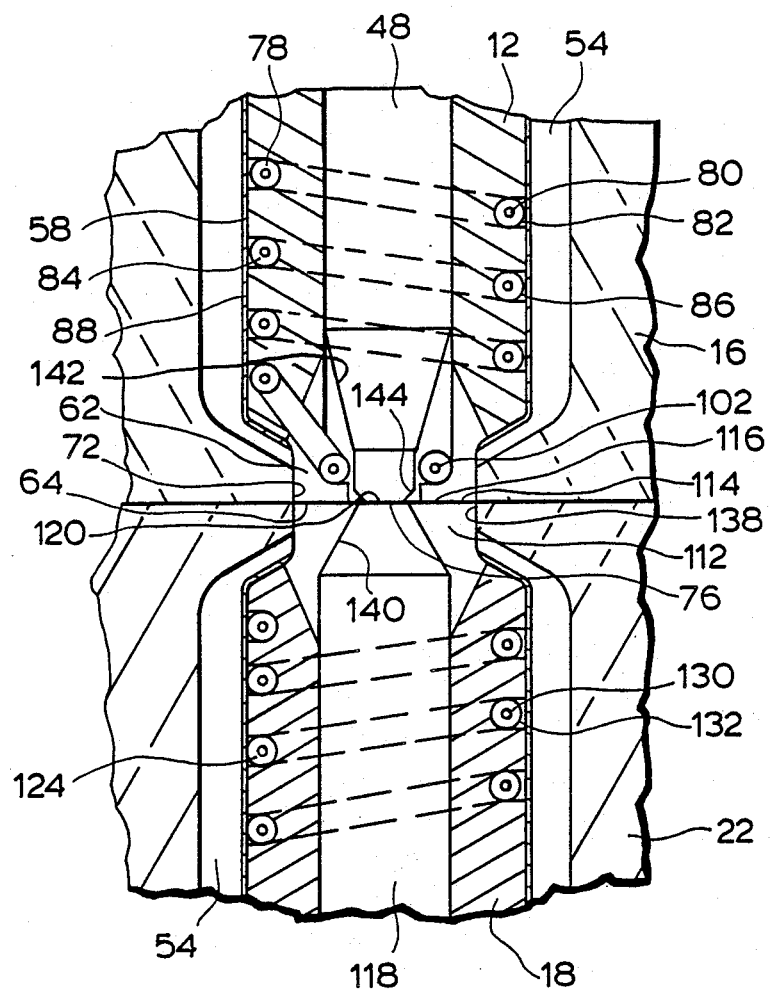
FIG. 2 is an enlarged sectional view showing the nose portions of the upstream and downstream nozzles seen in FIG. 1.

Successful continual operation of this stack molding system is also dependent on the size and shape of the melt passage 10 as it passes through the sprue gate between the upstream nozzle 12 and the downstream nozzle 18, and the timing of the various steps in the cycle. As can clearly be seen in FIG. 2, the melt bore 48 of the upstream nozzle 12 tapers inwardly adjacent the forward face 64 of the nose portion 62. The melt bore 118 of the downstream nozzle 18 also tapers inwardly at 140 adjacent the forward face 114 to form a sprue gate of a reduced diameter where the nose portions of the two nozzles abut. Due to the structure of the upstream nozzle 12 having the circular forward portion 102 of the heating element 78 in the nose portion 62, the taper of the melt bore 48 occurs in two stages 142,144. However, the taper of the stage 144 adjacent the forward face 64 is greater than the taper 140 of the melt bore 118 of the downstream nozzle. In fact, in this embodiment, the taper of the second stage 144 of the melt bore 48 of the upstream nozzle 12 is greater than 45° which facilitates successful operation of the gate.

While the description of the stack molding system has been given with respect to a particular embodiment, it is not to be construed in a limiting sense. Variations and modifications will occur to those skilled in the art. For instance, for some materials the system may be used without temperature assisted or thermal gating or only the upstream nozzle 12 may be thermal gated. In another embodiment of the invention for use with high temperature materials, the heating element 124 of the downstream nozzle 18 may also have a circular third portion integrally brazed in the nose portion 112 to substantially encircle the central melt bore 118, as shown for the upstream nozzle 12. Reference is made to the appended claims for a definition of the invention.

What I claim is:

1. A stack injection molding system for conveying melt from a fixed platen through a sprue gate to a movable platen, the movable platen being actuated according to an operating cycle between a closed position; wherein the fixed and movable platens abut and an open position wherein the fixed and movable platens separate along a parting line, the system comprising:

an upstream heated nozzle having an outer surface, a rear end, a front end and a nose portion with a forward face located at the front end, the upstream nozzle having a melt bore which extends centrally therethrough from an inlet at the rear end to an outlet at the forward face of the nose portion, the upstream nozzle having an electrically insulated heating element with a first portion extending from a terminal, a second portion integrally brazed in a spiral channel in the outer surface and a circular third portion integrally brazed in the nose portion of the nozzle to substantially encircle the central melt bore extending therethrough, the upstream nozzle being seated in the fixed platen with the nose portion extending through an opening in the fixed platen to the parting line, and a downstream heated nozzle having an outer surface, a rear end, a front end and a nose portion with a forward face located at the front end, the downstream nozzle having a melt bore which extends centrally therethrough from an inlet at the forward face of the front end to an outlet at the rear end, the downstream nozzle having an electrically insulated heating element with a first portion extending from a terminal and a second portion integrally brazed in a spiral channel in the outer surface, the downstream nozzle being seated in the movable platen with the melt bore through the downstream nozzle in alignment with the melt bore through the upstream nozzle and the nose portion of the downstream nozzle extending through an opening in the movable platen to a position wherein the forward face of the nose portion of the downstream nozzle abuts against the forward face of the nose portion of the upstream nozzle in the closed position.

2. An injection molding system as claimed in claim 1 wherein the melt bore of the upstream nozzle tapers inwardly adjacent the forward face of the nose portion of the upstream nozzle and the melt bore of the downstream nozzle tapers inwardly adjacent the forward face of the nose portion of the downstream nozzle.

3. An injection molding system as claimed in claim 2 wherein the inward taper of the melt bore of the upstream nozzle is greater than the inward taper of the melt bore of the downstream nozzle.

4. An injection molding system as claimed in claim 3 wherein the melt bore of the upstream nozzle tapers inwardly at an angle of greater than 45° adjacent the forward face of the nose portion of the upstream nozzle.

5. An injection molding systems as claimed in claim 1 wherein the hating element of the downstream nozzle also has a circular third portion integrally brazed in the nose portion of the nozzle to substantially encircle the central melt bore extending therethrough.

* * * * *